United States Patent [19]

Lebold et al.

[11] Patent Number: 5,384,188
[45] Date of Patent: Jan. 24, 1995

[54] INTUMESCENT SHEET

[75] Inventors: Alan R. Lebold, Niagara Falls; John D. Ten Eyck, Lewiston, both of N.Y.

[73] Assignee: The Carborundum Company, Niagara Falls, N.Y.

[21] Appl. No.: 977,390

[22] Filed: Nov. 17, 1992

[51] Int. Cl.$^6$ .................... B32B 5/16; C09K 21/00
[52] U.S. Cl. ..................... 428/283; 252/606; 428/288; 428/703; 428/913; 428/920; 428/921
[58] Field of Search ............ 428/281, 283, 288, 913, 428/920, 921, 302, 703; 252/606

[56] References Cited

U.S. PATENT DOCUMENTS

| | | |
|---|---|---|
| 3,916,057 | 10/1975 | Hatch et al. . |
| 4,018,983 | 4/1977 | Pedlow . |
| 4,271,228 | 6/1981 | Foster et al. . |
| 4,305,992 | 12/1981 | Langer et al. . |
| 4,363,199 | 12/1982 | Kucheria et al. . |
| 4,385,135 | 5/1983 | Langer et al. . |
| 4,443,517 | 4/1984 | Shah . |
| 4,454,190 | 6/1984 | Katagiri . |
| 4,529,662 | 7/1985 | Lancaster et al. . |
| 4,676,929 | 6/1987 | Rittler . |
| 4,729,853 | 3/1988 | von Bonin .................. 252/601 |
| 4,999,168 | 3/1991 | Ten Eyck . |
| 5,132,054 | 7/1992 | Stahl ........................ 252/606 |
| 5,258,216 | 11/1993 | von Bonin et al. ............ 428/102 |

FOREIGN PATENT DOCUMENTS

| | | |
|---|---|---|
| 0508751A2 | 10/1992 | European Pat. Off. . |
| 1513808 | 10/1975 | United Kingdom . |

OTHER PUBLICATIONS

U.S. Ser. No. 7/977,390, Nov. 17, 1992, A. R. Lebold, et al.

*Primary Examiner*—James D. Withers
*Attorney, Agent, or Firm*—Richard L. Hansen

[57] ABSTRACT

A flexible, resilient, intumescent mat material comprising fiber, binder, and an intumescent agent which includes a mixture of unexpanded vermiculite and expandable graphite undergoes intumescence at a lower temperature, with an enhanced degree of expansion and with a lesser degree of contraction upon prolonged heating. The intumescent mat can be employed in catalytic converters for motor vehicles and as a firestop material.

14 Claims, 3 Drawing Sheets

INTUMESCENT SHEET

This invention is in the field of intumescent mat materials, especially flexible, resilient mat materials adapted to serve, among other things, as heat-activated firestops in openings through the walls, floors and ceilings in buildings and to support, protect and cushion the fragile ceramic catalyst support found in catalytic converters for motor vehicles.

BACKGROUND

The catalytic converter in a motor vehicle is a part of its exhaust system and functions to decrease air pollution generated by such vehicles. In general terms, a catalytic converter includes a housing with an exhaust gas inlet at one end and an exhaust gas outlet at the other end. Within the housing, the exhaust gas contacts a catalyst which is carried on a support member capable of withstanding the temperature of the gas, i.e., as high as about 1200° C. In order to withstand the heat, the support member is generally a monolithic ceramic honeycomb structure onto which the catalyst is applied. The ceramic materials employed are brittle, fragile and easily broken. Consequently, the catalyst support must be protected from excessive vibration and shock which could fracture it.

In order to cushion the catalyst support, a flexible, resilient intumescent mat material, having a nominal thickness between about 3 mm and about 12 mm and a density of about 0.3 to about 0.8 grams/cm$^3$, is generally wrapped around the catalyst support, separating it from the housing wall. The first time the engine is run, the exhaust gas heats the intumescent mat, triggering its expansion to fill any void between the mat and the housing wall. The temperature at which intumescence occurs and the degree and permanence of the expansion attained are important parameters in this application. If the mat fails to expand properly at the exhaust gas temperature the catalyst support will not be effectively held in place.

As the exhaust gas initially enters the converter, the metal housing expands to a greater extent in response to the rising temperature than the ceramic catalyst support, creating an increasing gap between the two. The expansion of the intumescent mat must be both fast enough and large enough to tightly hold the catalyst support in place. The expanded mat also serves as a gas seal, preventing exhaust gas blow-by.

Diesel engines typically run at lower temperatures than gasoline engines, and the intumescent mat in a diesel engine catalytic converter is typically at a lower temperature than the corresponding intumescent mat in a gasoline engine, i.e., about 285° C., versus about 600° C. for a gasoline engine. The intumescent response of the mat in a diesel engine converter must be tailored to the lower temperature to ensure that the catalyst support is properly held in the catalytic converter and that exhaust gas blow-by is prevented.

The use of a firestop material to make a seal in openings through fire-resistant building dividers is described in U.S. Pat. No. 4,363,199. The firestop material disclosed in the '199 patent includes ceramic fiber and a fire resistant molding compound and is not intumescent. An intumescent firestop material offers advantages, including a more effective seal against the walls of the opening. In such applications, the degree to which the intumescent mat expands is critical, for it must fill the space it is designed to occupy and must do so at a rapid rate. Intumescent response at a relatively low temperature, rapid rate of expansion, and a high degree of expansion are all desirable. A high degree of expansion ensures that the sheet material will be pressed firmly against the periphery of the opening to be sealed.

Intumescent mat materials typically have employed unexpanded micaceous minerals as the intumescent agent. For example, U.S. Pat. No. 3,916,057 and GB 1 513 808 disclose intumescent mat materials adapted for use in catalytic converters. The mat materials contain up to about 75 wt % to 85 wt % unexpanded vermiculite. The use of unexpanded vermiculite as the intumescent agent and expanded vermiculite as a filler in a mat material intended for catalytic converter applications is disclosed in U.S. Pat. No. 4,385,135.

In U.S. Pat. No. 4,305,992, it is noted that unexpanded vermiculite undergoes a "negative expansion," i.e., a contraction, as it is heated in the 300° to 350° C. temperature range, expanding only when heated to 375° C. or higher. This initial contraction leaves the catalyst support open to damage unless and until the intumescent sheet expands sufficiently to bridge the space between the catalyst support and the housing wall. As disclosed in the '992 patent, treating the unexpanded vermiculite with an ammonium salt before using it reduces the initial contraction. This chemically treated (ion-exchanged) vermiculite is referred to as "IE vermiculite". The term "unexpanded vermiculite" is used herein to refer to either chemically treated or non-chemically treated vermiculite.

Although unexpanded vermiculite is commonly used as the intumescent agent in mat materials for catalytic converters, particulate graphite which has been treated with an oxidizing agent also becomes intumescent. The preparation of intumescent or expandable graphite is described in U.S. Pat. No. 4,454,190, where it is employed in making intumescent fiber felts for thermal insulation. The expandable graphite described in the '190 patent undergoes intumescence only when heated in the range 350° C. to 600° C., temperatures which are higher than desired for many applications, such as firestops or catalytic converters.

One advantage touted in the '190 patent for expandable graphite over unexpanded vermiculite as an intumescent agent is that the graphite burns off after it has caused the felt to expand. This "advantage" is, in fact, a disadvantage in other applications, e.g., catalytic converters.

In these applications, it is important that, once expanded in response to a sufficient temperature increase, the mat cannot shrink substantially if the mat is maintained at the increased temperature or cooled and then heated again repeatedly. With expandable graphite as the sole intumescent agent, it has been found that the mat shrinks upon continued heating at elevated temperatures, and the holding pressure of the mat against the catalyst support diminishes correspondingly.

The combination of vermiculite and graphite in a mat-like product has also been disclosed in the prior art. For example, a protective sheath or boot for electrical components is disclosed in U.S. Pat. No. 4,018,983. The product comprises a thermoplastic resin incorporating a heat-resistant fiber, which can be graphite fiber, and an intumescing or foaming component which can be vermiculite. A flexible mat useful as a gasket material or support, and containing exfoliated vermiculite together with graphite as a filler, is disclosed in U.S. Pat. No.

4,271,228. A mat material suitable for use in gaskets and containing both vermiculite and graphite flake is also disclosed in U.S. Pat. No. 4,443,517. A flexible mat material suitable for spiral-wound gaskets is described in U.S. Pat. No. 4,529,662, and the material can include mica or chlorite as well as graphite. A gel which can contain exfoliated vermiculite and graphite as a filler is disclosed in U.S. Pat. No. 4,676,929. Aside from U.S. Pat. No. 4,018,983, there is no indication that intumescence is a property of the articles containing both vermiculite and graphite which are described in the aforecited prior art.

SUMMARY OF THE INVENTION

Consequently, it is one object of this invention to produce a flexible, resilient, intumescent mat material containing unexpanded vermiculite as an intumescent agent, but an intumescent mat which expands at a lower temperature and with a higher degree of expansion than typically observed using vermiculite. It is another objective to produce a raw vermiculite-containing intumescent mat which also exhibits decreased initial contraction upon being heated. It is a further objective to obtain the aforesaid improvements in response temperature, initial contraction, and degree of expansion without introducing substantial shrinkage upon prolonged exposure to elevated temperatures or thermal cycling.

In attaining these objectives this invention provides, in one aspect, a flexible, resilient, intumescent mat material comprising about 15 weight percent (wt % hereinafter) to about 60 wt % fiber; about 3 wt % to about 9 wt % binder; about 20 wt % to about 60 wt % unexpanded vermiculite; and about 5 wt % to about 60 wt % expandable graphite.

In another aspect, this invention provides an improvement in a flexible, resilient, intumescent mat material containing unexpanded vermiculite, which comprises replacing up to about one-half the unexpanded vermiculite with an equal weight of expandable graphite.

In yet another aspect, this invention provides a slurry from which the aforesaid flexible, resilient, intumescent mat material can be produced. In still further aspects, this invention provides a catalytic converter and a firestop material, both of which include the new flexible, resilient, intumescent mat material of this invention.

The invention, together with the manner and the means by which it can be carried out will be clarified by reference to the drawings which accompany this specification and to the detailed description which follows.

DETAILED DESCRIPTION

Figure 1:
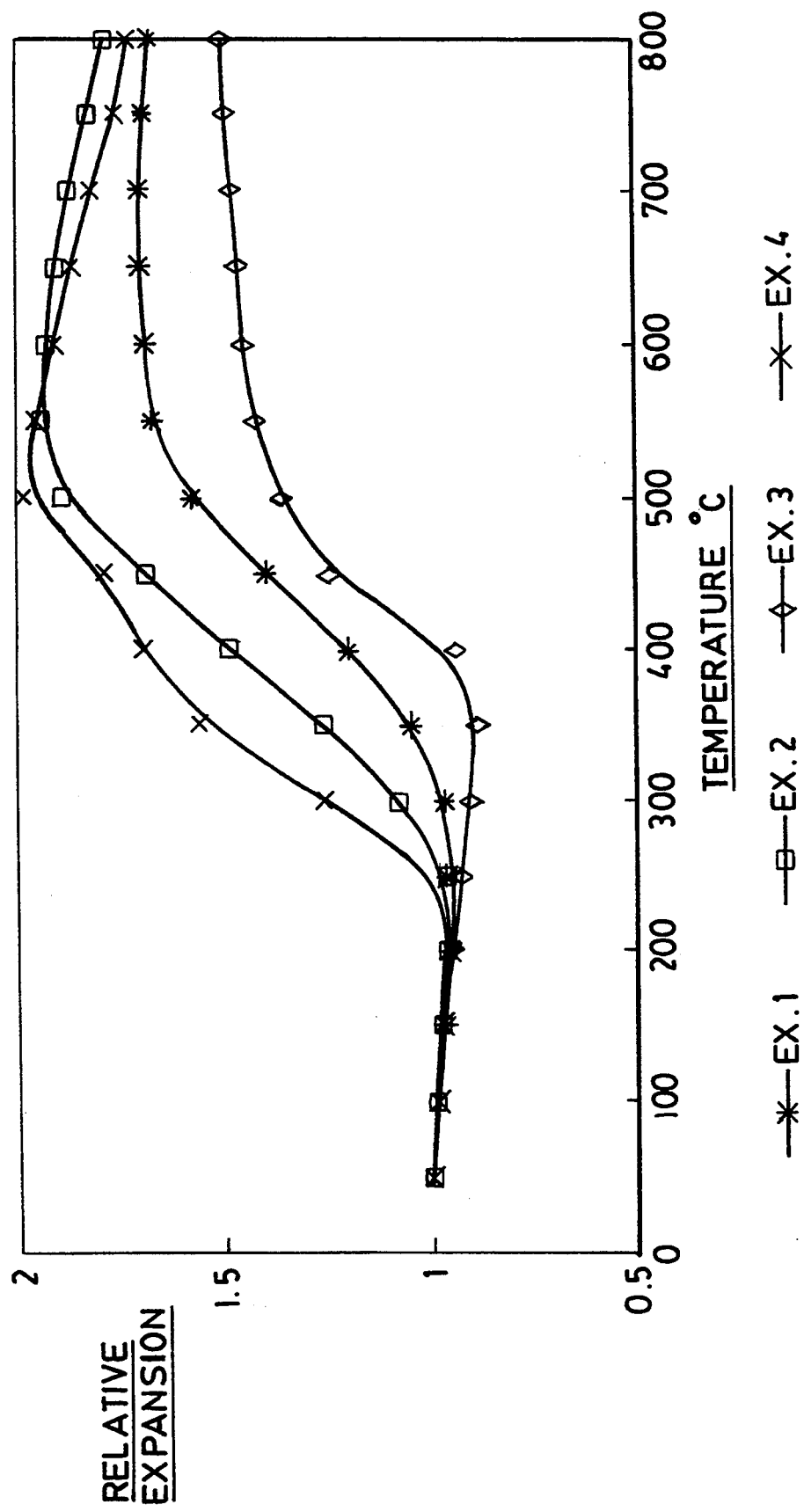
FIG. 1 displays in graphic form the relative expansion as a function of temperature for intumescent mat materials of this invention as well as intumescent mat materials of the prior art.

The flexible, resilient intumescent mat material of this invention can be produced in several different ways, but a conventional paper-making process, either hand laid or machine laid, is preferred. A handsheet mold, a Fourdrinier paper machine, or a rotoformer paper machine can be employed to make the intumescent mat. In any case, a flocculated aqueous slurry containing a number of components, as set forth below, is pressed to remove most of the water, and the mat is then dried. This process is well known to those skilled in the art.

Flexible, resilient intumescent mats in a range of thicknesses can be produced. Mats which are about 1 to about 13 mm thick are especially useful in firestop and catalytic converter applications; mats of lesser thickness can be stacked to produce thicker material as a given application requires. Variations in the composition of the mat lead to changes in its density in the range of about 0.3 to about 0.8 grams/cm$^3$.

A slurry from which the intumescent mat is produced includes water as the carrier medium, together with active ingredients, referred to hereinafter as "solids." In general, the solids will constitute no more than about 10 wt % of the slurry, preferably between about 1 wt % and about 5 wt %. The solids in the slurry, which become components of the final intumescent mat, comprise at least three elements, fiber, binder and intumescent agent. The fiber constitutes between about 15 wt % and about 60 wt % of the solids, the binder (excluding any vehicle associated specifically therewith) between about 3 wt % and 9 wt % of the solids, and the intumescent agent constitutes between about 30 wt % and 85 wt % of the solids. It should be understood that the solids in the slurry become the components of the mat. In most cases other materials, e.g., a flocculating agent, will also be present in much lesser amount.

The fiber constitutes about 15 wt % to about 60 wt % of the solids in the slurry and, e.g., between about 15 wt % and about 45 wt %. Preferably, the fiber constitutes between about 25 wt % and about 40 wt % of the solids, e.g., about 30 wt %. The fiber to be employed can be organic or inorganic or mixtures thereof. Suitable organic fibers include rayon, polyester and cellulose. At least half the fiber should be inorganic, especially if the sheet will experience temperatures above about 300° C. Inorganic fibers which can be employed alone or in combination include crysotile or amphibole asbestos, carbon, glass fibers such as chopped E glass, refractory filaments, including zirconia-silica fibers, crystalline alumina, zirconia and similar fibers, and alumina-silica fibers, such as those sold by The Carborundum Company, Niagara Falls, N.Y., under the FIBERFRAX® trademark. The last named fiber is preferred in that it retains its properties to temperatures in excess of 1000° C.

A decrease in shrinkage of the intumescent mat upon prolonged exposure to high temperatures is generally obtained by employing low shot, inorganic fiber. "Shot" are the spherical beads found on the ends of ceramic fibers. Replacing the weight of the missing shot with additional intumescent agent further decreases contraction of the mat upon prolonged heating.

With regard to the binder, which constitutes between about 3 wt % and about 9 wt % of the solids in the slurry and in the mat, preferably between about 2 wt % and about 7 wt %; e.g., about 6 wt %, it is preferred that it be an elastomeric material to provide flexibility and resilience to the mat. There are a number of aqueous latices which can be employed in the slurry. For example, acrylic latices, such as polyacrylonitrile, as well as vinyl latices, such as poly(vinyl chloride), poly(styrene-co-butadiene), etc. can be employed effectively.

The intumescent agent is a mixture of unexpanded vermiculite and expandable graphite which together constitute between about 30 wt % and about 85 wt % of the solids, preferably about 60 wt % of the solids in the slurry and in the mat. The relative amounts of these two agents, unexpanded vermiculite/expandable graphite, can range from about 9/1 to about $\frac{1}{2}$ on a wt % basis. Preferably, the unexpanded vermiculite will constitute between about 30 wt % and about 50 wt %, e.g., about 40 wt %, of the solids in the slurry and in the mat. It is preferred that the expandable graphite constitute between about 10 to 15 wt % and about 30 to 40 wt %, e.g., about 20 wt %, of the solids in the slurry and in the mat. The average particle sizes of the intumescent agents will typically be in range of about 0.15 to 0.85 mm.

The invention will be clarified by reference to the following Examples.

EXAMPLE 1

To a 20 l beaker equipped with a Lightning Labmaster Mixer and containing 9.52 l of water is added the following while stirring at 1750 rpm: 109 g FIBERFRAX ceramic fiber available from The Carborundum Co., Niagara Falls, N.Y. After stirring the slurry for 1 min., 33 g of HYCAR 26083 acrylic latex binder containing 52% solids and obtainable from B. F. Goodrich Chemical Co., Cleveland, Ohio, is added to the beaker, followed by 111 g unexpanded vermiculite, obtainable from W. R. Grace Co., Cambridge, Mass. as Grade No. 4, and 33.2 g unexpanded expandable graphite, an acid-treated natural graphite flake obtainable from Asbury Graphite Mills, Inc., Asbury, N.J. as Grade No. 3335. After stirring the slurry for 2 min., the pH is measured, and 10% aqueous sodium hydroxide is added until the pH of the slurry is 10.0, at which time 27 g of a 10 wt % aqueous solution of aluminum sulfate (alum) is added, causing flocculation of the slurry. The slurry is then poured into a handsheet mold having a screen area of 29.5 cm × 29.5 cm available from Williams Apparatus Co., Watertown, N.Y. The resultant sheet is pressed and dried affording a flexible, resilient, intumescent mat of this invention 4.95 mm thick and weighing 280 g.

EXAMPLE 2

Example 1 is repeated, except that 72.1 g of unexpanded vermiculite and 72.1 g of expandable graphite are employed.

EXAMPLE 3

Example 1 is repeated, except that all of the expandable graphite is replaced by an equal weight of the unexpanded vermiculite. The resultant mat is not of this invention.

EXAMPLE 4

Example 1 is repeated, except that all of the unexpanded vermiculite is replaced by an equal weight of the expandable graphite. The resultant mat is not of this invention.

EXAMPLE 5

The intumescent mats of Examples -4 are heated from about 50° C. to about 800° C. at a rate of 20° C./min while measuring the relative thickness of the mats. These measurements are carried out in a dilatometer built for the purpose and enclosed in a furnace chamber. In each case, a mat sample of 1 inch diameter is held between two horizontal quartz plates, the upper plate is loaded to 50 psi, and the relative thickness of the mat is measured mechanically as a function of time/temperature. The results appear in FIG. 1 in which "Relative Expansion" is defined as 1+[thickness at temperature−initial thickness].

EXAMPLE 6

Example 1 is repeated except that 81.1 grams of ceramic fiber of the low shot type, i.e., FIBERFRAX W707 ceramic fiber (low shot), is substituted For that employed in Ex. 1. Also, 138 grams of the unexpanded vermiculite, and 33 grams of the graphite flake are employed, making the total solids content of the slurry comparable to Example 1.

EXAMPLE 7

Figure 2:
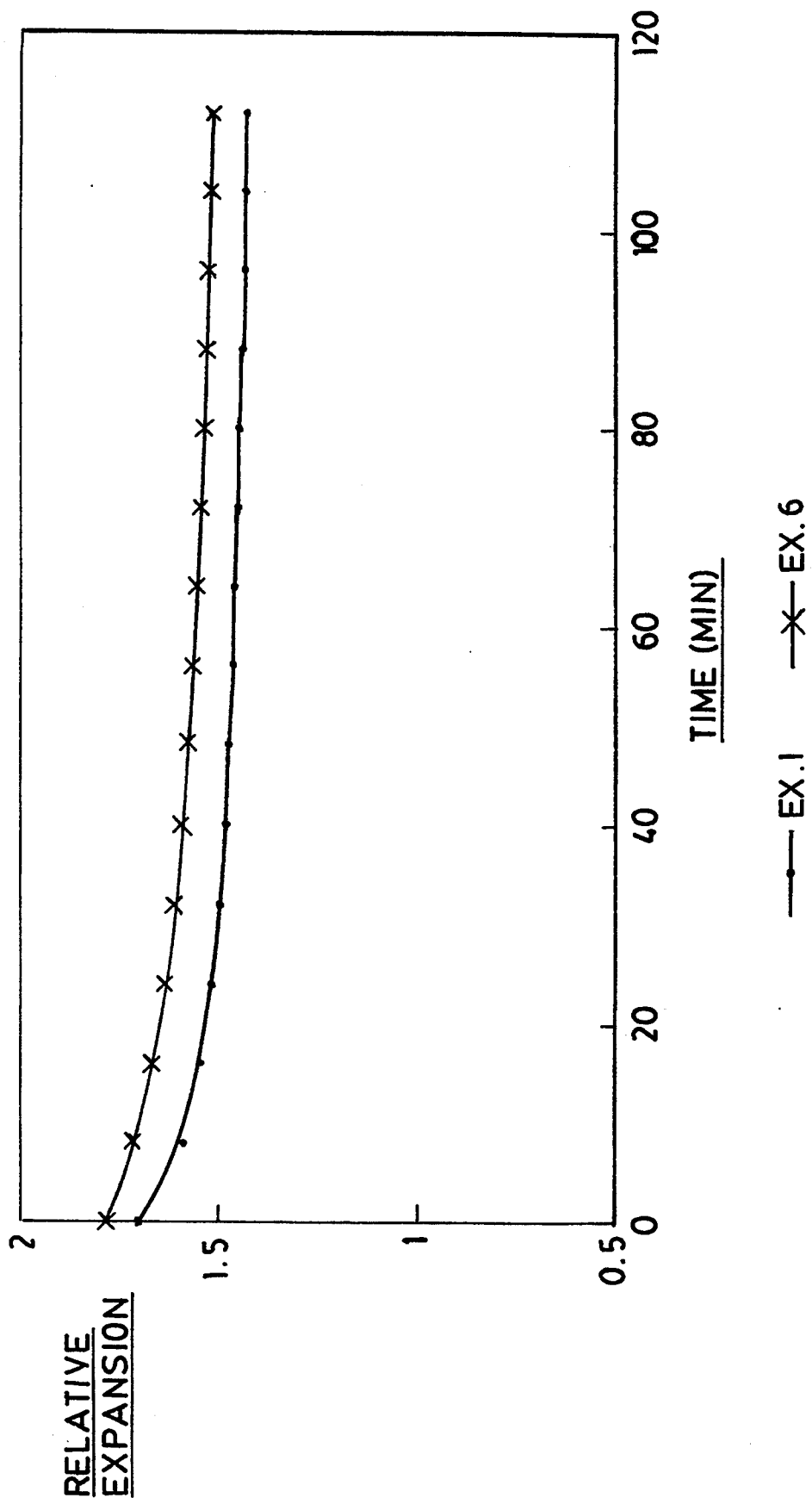
FIG. 2 graphically illustrates mat shrinkage at an elevated temperature for mat materials within the scope of the invention.

The intumescent mats of Examples 1 and 6 are expanded in the manner of Example 5. The mats are then heated at 750° C. for about two hours, the relative expansion of the mats being followed as a function of time. The results appear in FIG. 2, the result of using the low shot fiber and replacing the lost weight with intumescent agent being evident.

Figure 3:
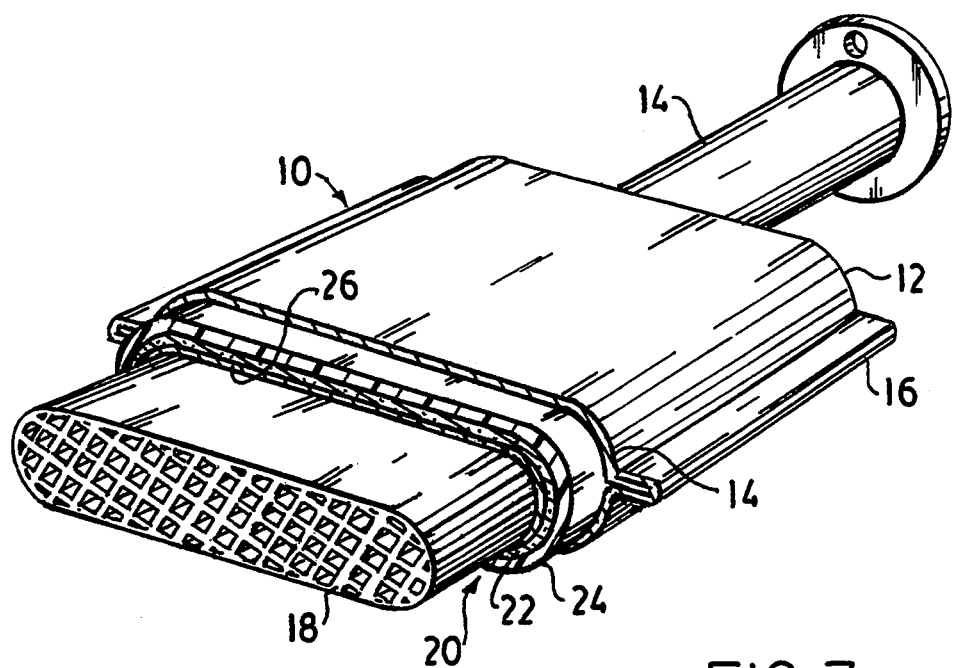
FIG. 3 is a view in perspective illustrating a catalytic converter of this invention.

With reference now to FIG. 3, catalytic converter 10 includes a generally tubular housing 12 formed of two pieces of metal, e.g., high temperature-resistant steel, held together at flange 16. Housing 12 includes an inlet 14 at one end and an outlet (not shown) at its opposite end. The inlet 14 and outlet are suitably formed at their outer ends whereby they may be secured to conduits in the exhaust system of an internal combustion engine. Converter 10 contains a fragile structure, such as frangible ceramic monolith 18 which is supported and restrained within housing 12 by intumescent sheet material 20. Monolith 18 includes a plurality of gas-pervious passages which extend axially from its inlet end face at one end to its outlet end face at the opposite end. Monolith 18 is constructed of a suitable refractory or ceramic material in known manner and configuration. Monoliths are typically oval or round in cross-sectional configuration, but other shapes are possible. The intumescent sheet material 20 includes intumescent mat 22 of this invention which has a substantially uniform thickness and which is adhesively bonded to a reinforcing layer 24. In some embodiments it may be desirable to also include ceramic fiber layer 26 which can be placed against the monolith 18.

Figure 4:
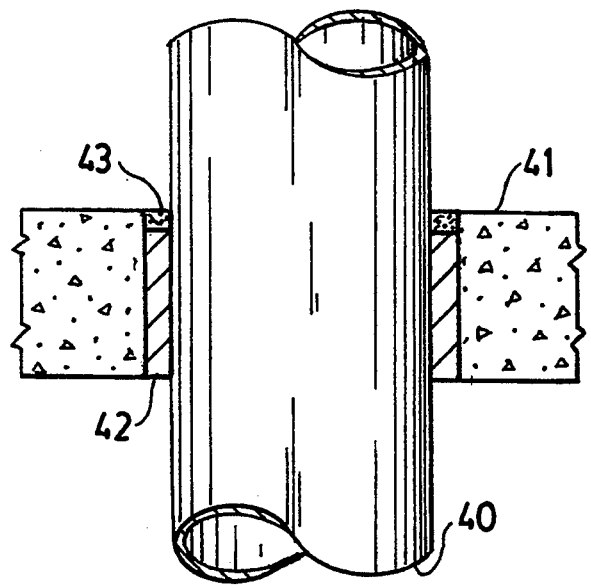
FIG. 4 is a diagrammatic sectional view showing the firestop material of this invention in use.

The intumescent mat of this invention can also be employed as a firestop between rooms or other spaces separated by a divider having a passage therethrough. For example, with reference to FIG. 4, pipe 40 passes through divider 41, a concrete floor. Intumescent firestop 42 of this invention is inserted into the passage space between the floor and the pipe. Although not required, the installation is preferably completed by sealing one or both ends of the passage with a refractory putty 43. In this regard, FYRE PUTTY ® brand refractory putty, available from The Carborundum Company, Niagara Falls, N.Y. performs very well in this application.

It will be evident that this invention is not limited to the embodiments specifically exemplified herein but is to be accorded the full breadth set forth in the following claims.

We claim:

1. A homogeneous flexible, resilient, intumescent mat comprising (a) about 15 wt % to about 60 wt % fibers, at least half of which are inorganic fibers;
(b) about 3 wt % to about 9 wt % binder;
(c) about 20 wt % to about 60 wt % unexpanded vermiculite; and
(d) about 5 wt % to about 60 wt % expandable graphite.

2. An intumescent mat of claim 1 which, upon initial heating, expands at a temperature below about 300° C. and exhibits a relative expansion greater than about 1.50 below about 500° C. when said mat is heated from about 50° C. to about 800° C. at a rate of about 20° C./min and which undergoes a decrease in relative expansion of less than about 0.4 upon being heated at about 750° C. for about 60 min.

3. The mat of claim 1 wherein (c) and (d) together comprise between about 30 wt % and about 85 wt % of said mat.

4. The mat of claim 1 in which a portion of said fibers is selected from the group consisting of asbestos, carbon, glass, zirconia-silica, alumina, zirconia, alumina-silica, rayon, polyester, cellulose and mixtures thereof.

5. The mat of claim 4 wherein said fibers are alumina-silica fibers.

6. The mat of claim 1 wherein said fiber are low shot inorganic fibers.

7. The mat of claim 1 in which said binder is a latex selected from the group consisting of vinyl and acrylic latices.

8. The mat of claim 7 wherein said binder is an acrylic latex.

9. The mat of claim 1 wherein the ratio of unexpanded vermiculite/expandable graphite is in the range from about 9/1 to about ½ on a weight/weight basis.

10. A flexible, resilient, intumescent mat comprising
(a) about 25 wt % to about 40 wt % low shot alumina-silica fiber;
(b) about 2 wt % to about 7 wt % acrylic latex binder;
(c) about 30 wt % to about 50 wt % unexpanded vermiculite; and
(d) about 15 wt % to about 40 wt % expandable graphite;

whereby said mat, upon initial heating, expands at a temperature below about 300° C. and exhibits a relative expansion greater than about 1.50 below about 500° C. when said mat is heated from about 50° C. to about 800° C. at a rate of about 20° C./min; which initially heated mat undergoes a decrease in relative expansion of less than about 0.4 upon being heated at about 750° C. for about 60 min.

11. In a flexible, resilient, intumescent mat comprising unexpanded vermiculite as the sole intumescent agent, the improvement therein which comprises replacing a portion of the unexpanded vermiculite with expandable graphite, whereby the temperature at which the initial expansion of the mat occurs is reduced and the degree of expansion of the mat is increased.

12. The intumescent mat of claim 11 wherein up to about two-thirds of the unexpanded vermiculite is replaced with expandable graphite.

13. An intumescent firestop for limiting the spread of fire through openings in the walls, floors and ceilings of structures which comprises a homogeneous flexible, resilient, intumescent mat including
(a) about 15 wt % to about 45 wt % fiber, at least half of which are inorganic fibers;
(b) about 3 wt % to about 9 wt % binder;
(c) about 20 wt % to about 60 wt % unexpanded vermiculite; and
(d) about 10 wt % to about 30 wt % expandable graphite.

14. A firestop of claim 13 in which said mat, upon initial heating, expands at a temperature below about 300° C. and exhibits a relative expansion greater than about 1.50 below about 500° C. as said mat is heated from about 50° C. to about 800° C. at a rate of about 20° C./min and in which said initially heated mat undergoes a decrease in relative expansion of less than about 0.4 upon being heated at about 750° C. for about 60 min.

* * * * *